US005587714A

United States Patent [19]

Chu et al.

[11] Patent Number: 5,587,714

[45] Date of Patent: Dec. 24, 1996

[54] SPACECRAFT ANTENNA POINTING ERROR CORRECTION

[75] Inventors: Peter Y. Chu, Palo Alto; Alfred H. Tadros, San Jose, both of Calif.

[73] Assignee: Space Systems/Loral, Inc., Palo Alto, Calif.

[21] Appl. No.: 401,863

[22] Filed: Mar. 10, 1995

[51] Int. Cl.[6] .................... H04B 7/185

[52] U.S. Cl. .................... 342/354

[58] Field of Search .................... 342/354

[56] References Cited

U.S. PATENT DOCUMENTS

| | | | |
|---|---|---|---|
| H1,383 | 12/1994 | Kaplan et al. | 342/372 |
| 3,757,336 | 9/1973 | Rosen | 343/100 ST |
| 4,687,161 | 8/1987 | Plescia et al. | 244/171 |
| 4,823,134 | 4/1989 | James et al. | 342/359 |
| 4,883,244 | 11/1989 | Challoner et al. | 244/171 |
| 5,175,556 | 12/1992 | Berkowitz | 342/354 |
| 5,184,139 | 2/1993 | Hirako et al. | 342/354 |
| 5,257,759 | 11/1993 | Bender | 244/168 |

*Primary Examiner*—Theodore M. Blum
*Attorney, Agent, or Firm*—Perman & Green

[57] ABSTRACT

A system and method employ a sensing of the attitude or orientation of a spacecraft for correcting the orientation of a line of sight of an instrument carried by a spacecraft to compensate for a transient perturbation in the attitude of the spacecraft. The instrument may be a microwave antenna for communicating with a station on the earth, or a camera for viewing the earth. The transient perturbation in the orientation, such as may be caused by the firing of a thruster of the spacecraft, is extracted from a measurement of the spacecraft orientation, such as the orientation relative to the earth. The line of sight of the instrument is reoriented by injection of an incremental orientation equal and opposite to the transient perturbation. The application of the incremental orientation can be accomplished in mechanical fashion, in the case of an antenna mechanically mounted to the spacecraft, and electrically, as in the case of a phased array antenna carried by the spacecraft.

5 Claims, 2 Drawing Sheets

SPACECRAFT ANTENNA POINTING ERROR CORRECTION

BACKGROUND OF THE INVENTION

This invention relates to the correcting of pointing error for instrumentation including antennas and other sensors carried by spacecraft encircling the earth and, more particularly, to a redirection of an instrument relative to the spacecraft to compensate for transient changes in spacecraft orientation.

Spacecraft encircling the earth in the manner of satellites may be used for observation and communication. In the case of an observation satellite, the satellite may carry photographic sensors observing cloud formation and other geographic subject matter, by way of example. Communication satellites may employ microwave antennas oriented for transmitting and/or receiving beams of electromagnetic radiation for communicating signals between the spacecraft and one or more earth stations. In both the cases of the observation satellite and the communication satellite, as well as for other spacecraft missions, it is important to maintain accurate orientation of the instrument to insure that the line of sight is pointing in a desired direction.

By way of example in the practice of such satellite missions, one, may consider a communication system employing a spacecraft encircling the earth. An antenna carried by the spacecraft for communication with an earth station may have a beam configuration which is, by way of example, generally circular with a width of 1 degree or, by way of further example, which is generally rectangular with width dimensions of 2 degrees by 0.5 degrees. With such dimensions of beam configuration, a pointing error of 0.1 degrees, by way of example, could provide a significant degradation in operation of a communications link provided by the antenna. One method of control of the orientation of an electromagnetic beam transmitted by a communications antenna is known as autotrack, and employs a receiving beam at the same antenna to view a signal transmitted by a station on the earth. Both the antenna and microwave circuitry connected to the antenna are modified by the inclusion of additional components for the detection of antenna beam pointing error, similar to that of a monopulse radar, so that antenna beam pointing error can be obtained by examination of the up-link signal received from the ground station. Information about the pointing error can then be employed by mechanical or electronic beam steering apparatus to correct the antenna beam orientation.

There are various sources of error in the orientation of the antenna (or other instrument) carried by the spacecraft, ranging from inaccuracies in the orientation of the spacecraft to dimensional changes in an antenna mount resulting from thermal expansion due to exposure to sunlight. In order to compensate for such inaccuracies, to provide for desired orientation of spacecraft instrumentation, various systems have been proposed such as, by way of example, a pointing compensation system for spacecraft instruments disclosed in Plescia et al, U.S. Pat. No. 4,687,161. Such a system compensates the instrument pointing for any disturbances by on-board motions known a priori, but does not measure the pointing errors induced by the disturbances.

Consideration is given also to short term or transient departures of spacecraft orientation from a desired orientation. Spacecraft employ thrusters and momentum wheels for correction of spacecraft orientation. A gradual reorientation of a spacecraft can be accomplished by use of one or more of the momentum wheels, while excessive departure from a desired orientation can be corrected rapidly by the firing of one or more thrusters of the spacecraft. Typically, in the control of spacecraft orientation, there may well be a hand-off between the thruster control to momentum wheel control. A firing of the thrusters can correct the spacecraft orientation within a fraction of a minute while use of the momentum wheels may employ an interval of 10–15 minutes for adjustment of the spacecraft orientation relative to the earth. Also, during the use of the thrusters, and during a hand-off between the thrusters to the momentum wheels, there is a relatively rapid change in the orientation of the spacecraft as well as in the various instruments, including antennas and photographic cameras carried by the spacecraft. Such a rapid perturbation, even if relatively small, can produce a significant and noticeable defect in the signal strength of a communication link in the situation wherein the perturbation is greater than approximately the aforementioned pointing error of 0.1 degrees.

A problem arises in that existing orientation systems and methodologies may not provide an adequate speed of response to compensate for such transient behavior of the spacecraft orientation. Even if adequate speed of response is provided, as can be accomplished with the aforementioned autotrack technology, there is a significant increase in the complexity, expense, and amount of microwave equipment which must be added to a communication system.

SUMMARY OF THE INVENTION

The aforementioned problem is overcome and other advantages are provided by a system and method, in accordance with the invention, wherein the line of sight of instrumentation carried by the spacecraft, such as the line of sight of an optical telescope or the line of sight of an antenna, is oriented correctly even in the case of a transient perturbation in the attitude of the spacecraft. This is accomplished by observing the orientation of the spacecraft as by means of an earth sensor or a star sensor or by means of computations involving inertial navigation with a gyrocompass. Such apparatus for the observation of spacecraft orientation is carried normally by a spacecraft, and is available for use in the practice of the invention. This avoids the problem of increased expense and complexity associated with the introduction of the aforementioned microwave circuitry for the sensing of beam pointing error introduced by spacecraft movement. Observation of the spacecraft orientation provides an indication of any error in its orientation. Sudden transient perturbation in the orientation of the spacecraft is communicated to the line of sight of the instrumentation. Accordingly, the invention provides for application of a correction signal to a beam-positioning device of the instrumentation, thereby to inject a compensating angular offset which is equal and opposite to the spacecraft pointing error. This compensates for the spacecraft pointing error and maintains the desired orientation of the line of sight of the instrumentation.

A feature of the invention is the correction of a transient component of the spacecraft pointing error so as to maintain a desired orientation of the line of sight during an interval of rapid reorientation of the spacecraft as may occur during a firing of a spacecraft thruster. The controller extracts the transient portion of the perturbation in orientation by use of a filter such as a high-pass filter responsive to events occurring within a time interval shorter than approximately one minute, by way of example. Thereby, the invention can be employed in conjunction with conventional devices for the stabilization of a line of sight without introduction of costly and complex RF (radio frequency) sensor equipment as in employed in an autotrack system.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures but may not be referenced in the description for all figures.

DETAILED DESCRIPTION

Figure 1:
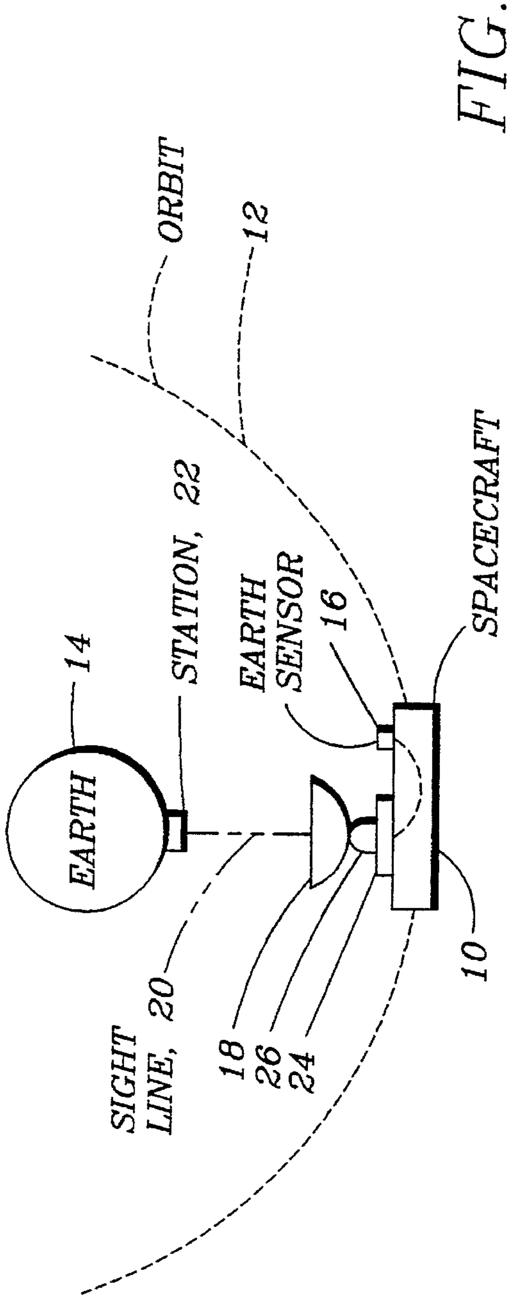
FIG. 1 is a stylized view of a spacecraft encircling the earth, an orbit of the spacecraft being partially shown in the figure.

FIG. 1 shows a spacecraft 10 traveling along an orbital path 12 about the earth 14. In order to insure a desired attitude or orientation of the spacecraft 10 relative to the earth 14, the spacecraft 10 is provided with a sensor 16 which views the earth 14 to determine that the spacecraft 10 is facing directly at the earth 14. The sensor 16 signals any offset in orientation of the spacecraft 10 from a desired orientation. The traveling of the spacecraft 10 about the earth, and the viewing of the earth by the earth sensor 16 is provided by way of example, it being understood that, in the general case, spacecraft attitude may be determined by use of a star sensor (not shown) which sights a star rather than by use of the earth sensor 16 which sights the earth. While the mission of the spacecraft may be for weather forecasting or geologic studies, by way of example, the use of the spacecraft 10 for communication purposes is illustrated in FIG. 1.

For the communication mission, the spacecraft 10 carries a microwave antenna 18 which generates a beam of electromagnetic power directed along a line of sight 20 to a communication station 22 on the earth. The microwave antenna 18 represents one form of instrumentation which may be carried by the spacecraft 10, it being understood that other forms of instrumentation, such as a photographic camera (not shown) may be carried by the spacecraft 10 for viewing the earth along the sight line 20 to accomplish some other form of mission such as the aforementioned weather forecasting. The antenna 18 is mounted to the spacecraft 10 by means of an antenna positioning mechanism 24, the latter connecting with the antenna 18 by means of a pivoting linkage 26. The pivoting linkage 26 allows the antenna 18 to be tilted in pitch and in roll. The antenna positioning mechanism 24 connects with conventional antenna steering equipment (not shown) for steering the antenna in any desired position. In addition, the antenna positioning mechanism 24 includes a controller 28 (shown in FIG. 2) which is responsive to signals of the earth sensor 16 for correcting the orientation of the antenna 18 to compensate for any transient perturbation in the attitude of the spacecraft 10.

Figure 2:
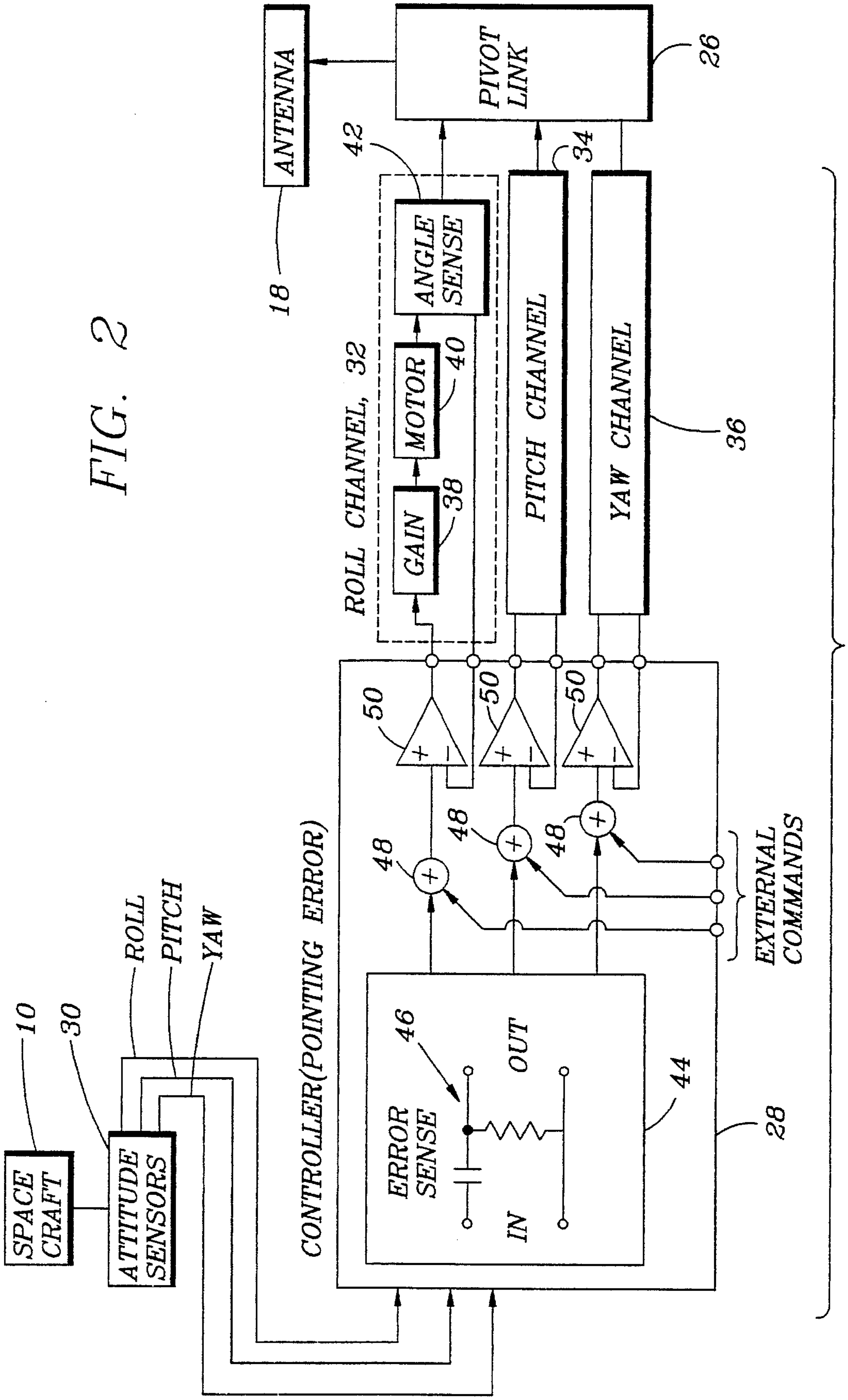
FIG. 2 is a block diagram of an antenna positioning mechanism, including electrical circuitry, operative in accordance with the invention for reorienting an antenna of the spacecraft to compensate for a spacecraft pointing error.

FIG. 2 shows the general case of a set of attitude sensors 30 which monitor the attitude of the spacecraft 10. The sensors 30 output signals designating the spacecraft attitude with respect to a roll axis, a pitch axis, and a yaw axis. The mechanism 24 comprises three channels, namely, a roll channel 32, a pitch channel 34, and a yaw channel 36 which operate via the pivoting linkage 26 to establish the orientation of the antenna 28. Each of the channels 32, 34, and 36 comprises a signal gain unit 38, an electric motor 40 which is preferably a stepping motor, and some form of sensing of an amount of rotation of the motor 40 represented by a sensor 42 which may be a shaft angle sensor or simply a counter of electric current pulses applied to the windings of the motor 40. By way of example., in the situation wherein the motor 40 is a stepping motor, the gain unit 38 comprises a motor control circuit for generating the pulses which activate the motor 40. Rotation of an output shaft of the motor 40 is employed to impart rotational movement of the antenna 18 about a corresponding one of the roll, the pitch, and the yaw axes. An amount of the angular rotation is sensed by the sensor 42. Well-known step-down gearing (not shown) may be employed in the connecting of the motors 40 of respective ones of the channels 32, 34, and 36 to the linkage. 26.

In accordance with the invention, the controller 28 of the antenna positioning mechanism 24 is connected between the attitude sensors 30 and the channels 32, 34, and 36 for correction of any pointing error which may be present in the spacecraft 10. The controller 28 includes error sensing circuitry connected to the roll, pitch, and yaw signals outputted by the attitude sensors 30 for developing drive signals which are applied to the corresponding roll, pitch and yaw channels 32, 34, and 36. It is understood that, in the general case, the attitude sensors 30 may include an earth sensor, such as the earth sensor 16 of FIG. 1, or a star sensor (not shown) or inertial navigator including a gyro compass (not shown). The error sensor 44 is operative to extract a transient perturbation of the roll, pitch and yaw orientation signals of the sensors 30. This may be accomplished, by way of example, by including a high-pass filter 46 within the error sensor, such a filter including typically a series capacitor and shunt resistor as shown in FIG. 2. Normally, in the practice of the invention, the high-pass filter would be implemented by digital circuitry, as is well known in the use of computers and, preferably, the entire controller 28 would be implemented by digital circuitry.

Roll, pitch, and yaw components of the orientation signals outputted by the error sensor 44 are combined by summers 48 with external roll, pitch and yaw commands, respectively, from an external source of these commands such as a well-known antenna steering unit (not shown) carried by the spacecraft 10. Output signals of the summers 48 are applied to noninverting output terminals of differential amplifiers 50, the amplifiers 50 applying their respective output signals to the gain units 38 of the respective channels 32, 34, and 36. Angle signals outputted by the sensors 42 of the respective channels 32, 34, and 36 are applied to the inverting input terminals of the respective ones of the amplifiers 50. The signals outputted by the angle sensors 42 serve as feedback signals in feedback control loops of the respective channels 32, 34, and 36. The amplifiers 50 may include loop filtering (not shown) providing stable operation of the channels 32, 34, and 36.

In the general case wherein the roll and pitch axes of the antenna 18 are in alignment with the corresponding roll and pitch axes of the attitude sensors 30, only the error correction signals of the roll and the pitch channels 32 need be employed for tilting the antenna 18 relative to the spacecraft 10 to compensate for a perturbation in the attitude of the spacecraft 10. The yaw channel 36 may be employed to rotate the antenna 18 about the sight line 20 to compensate for a yaw offset in the directions of the transverse electric and transverse magnetic vectors of the transmitted (or received) electromagnetic signal at the antenna 18. In the event that the pivoting linkage 26 provides for only two axes of correction, namely the roll axis and the pitch axis, then the yaw channel of the antenna positioning mechanism 24 would not be utilized.

Figure 3:
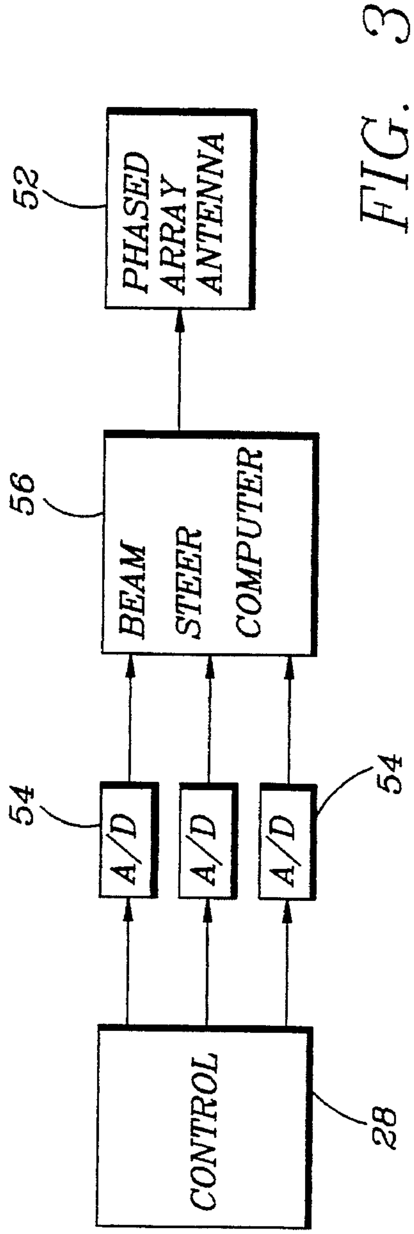
FIG. 3 is a block diagram of an alternative configuration of the apparatus of FIG. 2 wherein the antenna is a phased array antenna with compensation for pointing error being attained electronically.

FIG. 3 shows an alternative embodiment of the invention wherein the controller 28 is employed for adjusting the orientation of a beam provided by a phased array antenna 52 instead of the mechanically steered antenna 18 of FIGS. 1 and 2. In FIG. 3, the roll, pitch and yaw correction signals provided by the controller 28 are applied via analog-to-digital converters 54 to a beam steering computer 56. The computer 56 is responsive to the error correction signals outputted by the controller 28 to output a set of phase shift commands which are applied to the elements of the phased array antenna 52. The phase shift commands create a phase taper across the antenna array via respective ones of the elements of the antenna 52, this resulting in a tilting of a beam outputted by the antenna 52 so as to be in alignment with the sight line 20 (FIG. 1) during the presence of a transient disturbance in the attitude of the spacecraft 10.

In the usual case wherein the axes of the antenna 52 are aligned with the axes of the attitude sensors (FIG. 2), only the roll and the pitch signals are employed in correcting the orientation of the beam of the antenna 52. The yaw signal channel may be employed, if desired, for correction of the yaw angle of the transverse electric and magnetic field components of the electromagnetic signal created from the antenna 52. For example, in the case of circular polarization, the rotational angle of the rotating electromagnetic field vector might be offset by a perturbation in the spacecraft orientation, which perturbation can be compensated by adjustment of the yaw angle of the electric field vector.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A system for correcting the pointing error of an instrument carried by a spacecraft comprising:

means for orienting a line of sight of the instrument relative to the spacecraft;

means for sensing an orientation of the spacecraft including a perturbation in said orientation, said perturbation being characterized in a spectral domain by a band of frequencies extending from a low-frequency end of said band to a high-frequency end of said band, to a high-frequency end of said band, a transient part of said perturbation being characterized in said spectral domain by a high-frequency portion of said band;

means coupled to said sensing means for extracting a transient part perturbation in said orientation, said extracting means comprising high-pass filter means which passes the high frequency portion of said band, while attenuating low-frequency portion of said band, for extracting said transient part of said perturbation; and compensating means responsive to said transient part of said perturbation, and operating independently of said low-frequency portion of said band, for commanding said orienting means to alter an orientation of said line of sight relative to said spacecraft by an incremental orientation equal and opposite to said transient part of said perturbation.

2. A system according to claim 1 wherein said orienting means provides for orienting the line of sight along plural axes of rotation.

3. A system according to claim 1 wherein said instrument is a microwave antenna mechanically connected to the spacecraft, and said orienting means provides for a mechanical orientation of said antenna.

4. A system according to claim 1 wherein said instrument is a phased-array antenna generating a beam along said line of sight, and said orienting means includes a beam-steering computer for electronically orienting said beam.

5. A method for correcting the pointing error of an instrument carried by a spacecraft comprising:

sensing an orientation of the spacecraft including a perturbation in said orientation, said perturbation being characterized in a spectral domain by a band of frequencies extending from a low-frequency end of said band to a high-frequency end of said band, a transient part of said perturbation being characterized in said spectral domain by a high frequency portion of said band;

extracting a transient part of said perturbation in said orientation, said extracting means comprising high-pass filter means which passes the high frequency portion of the band, while attenuating a low-frequency portion of said band, for extracting said transient part of said perturbation; and altering an orientation of a line of sight of the instrument relative to said spacecraft by an incremental orientation equal and opposite to said transient part of said perturbation said altering means being accomplished independently of said low-frequency portion of said band.

* * * * *